(12) United States Patent
Yamada (10) Patent No.: US 7,343,056 B2
(45) Date of Patent: Mar. 11, 2008

(54) ACOUSTOOPTIC FILTER (75) Inventor: Kiyokazu Yamada, Kusatsu (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 252 days.

(21) Appl. No.: 10/561,772

(22) PCT Filed: Apr. 22, 2004

(86) PCT No.: PCT/JP2004/005780

§ 371 (c)(1),
(2), (4) Date: Dec. 21, 2005

(87) PCT Pub. No.: WO2005/003847

PCT Pub. Date: Jan. 13, 2005

(65) Prior Publication Data

US 2007/0147723 A1    Jun. 28, 2007

(30) Foreign Application Priority Data

Jul. 7, 2003   (JP) .............................. 2003-193133

(51) Int. Cl.
*G02F 1/33*   (2006.01)
*G02F 1/335*   (2006.01)
(52) U.S. Cl. ........................... 385/7; 359/305; 359/308
(58) Field of Classification Search .................. 385/7
See application file for complete search history.

(56) References Cited

U.S. PATENT DOCUMENTS

| 5,400,171 | A | * | 3/1995 | Song | 359/285 |
|---|---|---|---|---|---|
| 5,610,760 | A | * | 3/1997 | Drenten et al. | 359/332 |
| 6,021,237 | A | * | 2/2000 | Kim et al. | 385/28 |
| 6,535,665 | B1 | * | 3/2003 | Kim et al. | 385/28 |
| 6,556,729 | B2 | * | 4/2003 | Satorius | 385/7 |
| 6,647,159 | B1 | * | 11/2003 | Satorius | 385/7 |
| 2002/0021853 | A1 | * | 2/2002 | Nakazawa et al. | 385/7 |

FOREIGN PATENT DOCUMENTS

JP       64-12710     *   1/1989

(Continued)

OTHER PUBLICATIONS

Written Opinion for corresponding international application (with English translation).

(Continued)

*Primary Examiner*—Michelle Connelly-Cushwa
*Assistant Examiner*—Rhonda S. Peace
(74) *Attorney, Agent, or Firm*—Dickstein Shapiro LLP (57) ABSTRACT

An acoustooptic filter 1 having an optical waveguide 3 disposed on an upper surface 2a of an acoustooptic substrate 2, an interdigital electrode 4 which excites a surface wave disposed on the acoustooptic substrate 2, a surface wave waveguide for the surface wave excited by the interdigital electrode 4 extends in substantially the same direction as the optical waveguide, and a mode of the light guided to the optical waveguide 3 is converted by the surface wave. The acoustooptic filter 1 includes a thin-film ridge 5 as a phase match condition changer that changes a phase match condition at a mutual action area by 0.235% or more from a state in which phases are matched, the mutual action area being an area where the surface acoustic wave and the light guided to the optical waveguide 3 act upon each other.

20 Claims, 10 Drawing Sheets

FOREIGN PATENT DOCUMENTS

| | | |
|---|---|---|
| JP | 06-067235 | 3/1994 |
| JP | 08-0520267 | 2/1996 |
| JP | 8-101363 A | 4/1996 |
| JP | 11-064809 | 3/1999 |
| JP | 11-84331 A | 3/1999 |
| JP | 11-326855 | 11/1999 |
| JP | 2001-228450 A | 8/2001 |

OTHER PUBLICATIONS

David A. Smith and John J. Johnson, "Low Drive-Power Integrated Acoustooptic Filter on X-Cut Y-Propagating LiNbO3" (IEEE Photonics Technology Letters, vol. 3, No. 10, Oct. 1991, pp. 923-925).

T. Hosoi, S. Mizuta and M. Kitamura, "Polarization Independent Tunable Filter Using a Straightly Focused Acoustic Beam on X-Cut Y-Propagating LiNbO3" (Technical Report of The Institute of Electronics, Information and Communication Engineers, OPE97-8 "May 1997" pp. 41-46).

M. Seino, "LiNbO3 Acousto-Optic Tunable Filter (AOTF)" (Fujitsu Labs, Ltd., Feb. 2000, pp. 159-164).

* cited by examiner

ACOUSTOOPTIC FILTER

CROSS REFERENCE TO RELATED APPLICATIONS

The present application is a national stage of PCT/JP2004/005780, filed Apr. 22, 2004, which claims priority to Japanese application No. 2003-193133, filed Jul. 7, 2003.

FIELD OF INVENTION

The present invention relates to an acoustooptic filter in which an interdigital electrode for exciting a surface wave is formed on an acoustooptic filter substrate having an optical waveguide and, more particularly, to an acoustooptic filter having a mutual action area where light and a surface acoustic wave act upon each other.

BACKGROUND ART

In recent years, for example, the widespread use of the Internet and the sudden increase in the number of in-company LANs have caused a rapid increase in data traffic. Therefore, the use of optical communication systems which can perform communications at high capacity have become widespread, not only for data traffic, but also even for access traffic. In order to perform optical communications at high capacities, optical transmission is sped up and optical wavelength division multiplexing is achieved. A light wavelength filter is available as an important component for realizing wavelength division multiplexing.

The light wavelength filter filters light of a particular wavelength, and is an important component for performing optical wavelength division multiplex communication.

Figure 12:
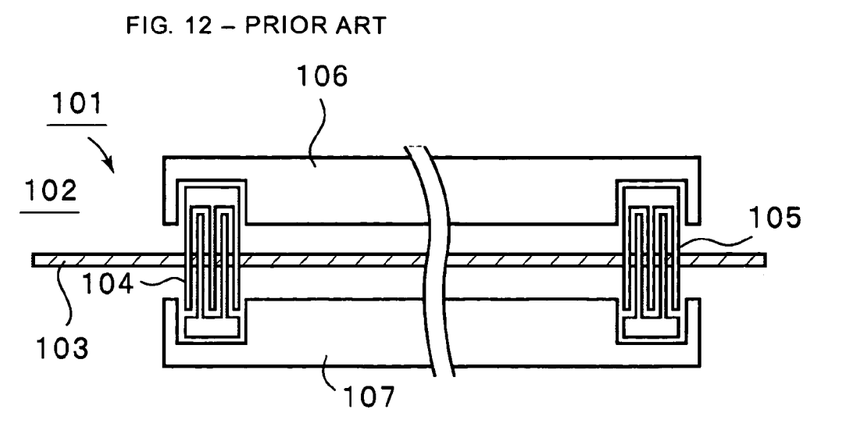
FIG. 12 is a schematic plan view of an example of a related light wavelength filter.

A light wavelength filter shown in FIG. 12 is disclosed in "Low Drive-Power Integrated Acoustooptic Filter On X-cut Y-propagating $LiNbO_3$," IEEEPHOTONICS TECHNOLOGY LETTERS, Vol. 3, No. 10, 1991. In a light wavelength filter 101, an optical waveguide 103 in which Ti is diffused is formed at an X-cut Y-propagating $LiNbO_3$ substrate 102. In order to excite a surface acoustic wave, IDTs 104 and 105 are disposed on the $LiNbO_3$ substrate 102. In order to form a surface acoustic wave waveguide, walls 106 and 107 in which Ti is diffused are disposed, one on each side of a surface acoustic wave propagation area. Here, a light wavelength filter having a narrow band at low electrical power is formed by forming the walls 106 and 107.

Figure 13:
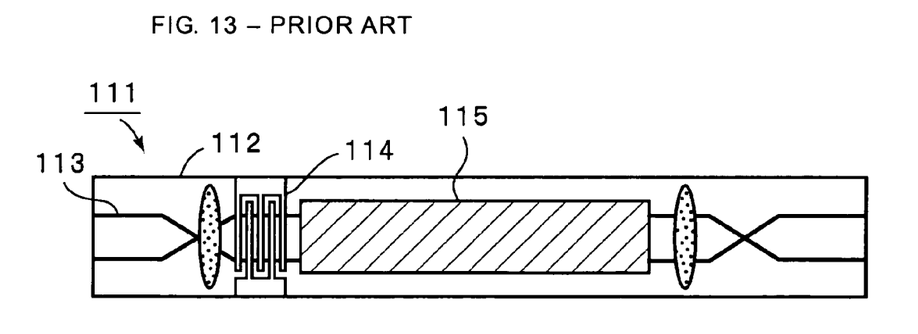
FIG. 13 is a schematic plan view of another example of a related light wavelength filter.

A light wavelength filter shown in FIG. 13 is disclosed in "$LiNbO_3$ Tunable Wavelength Filter Using Acoustooptic Effect" (Year 200 Commemoration of Advanced Technology Symposium, "Piezoelectric Materials and Acoustic Wave Devices," February, 2000). In a light wavelength filter 111, an optical waveguide 113 in which Ti is diffused is formed at an X-cut Y-propagating $LiNbO_3$ substrate 112. In addition, an IDT 114 is provided for exciting a surface wave. Further, in order to form a surface-wave waveguide, a film-addition-type guide 115 is formed. Accordingly, a light wavelength filter capable of being integrated and having a narrow band is realized.

Figure 14:
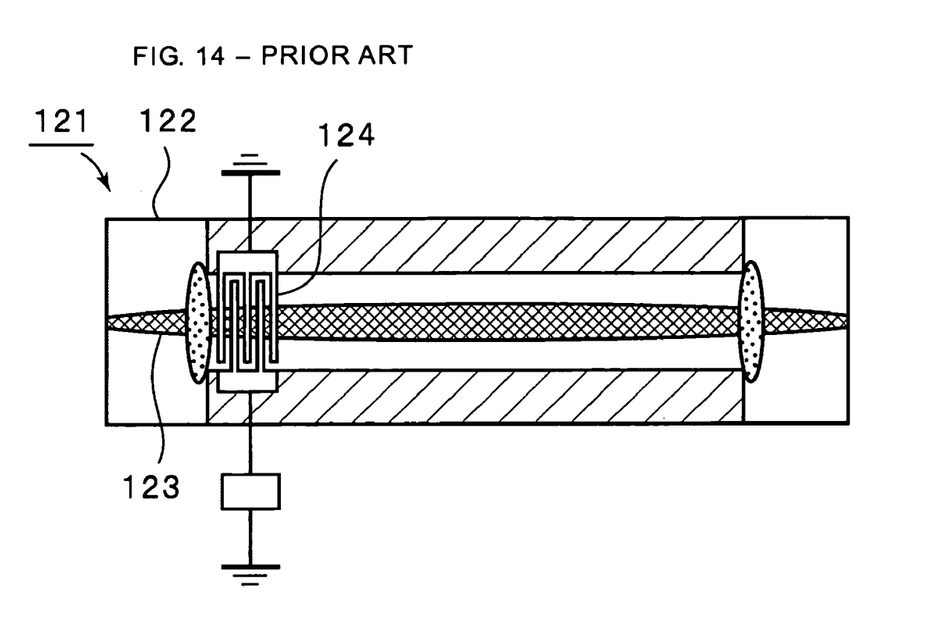
FIG. 14 is a schematic plan view of yet another example of a related light wavelength filter.

A light wavelength filter shown in FIG. 14 is disclosed in Japanese Unexamined Patent Application Publication No. 11-84331. In a light wavelength filter 121, an optical waveguide 123 and an TDT 124 are formed at a substrate 122. By changing the birefringence of the optical waveguide 123 in a mutual action area where a surface wave excited at the IDT 124 and light guided to the optical waveguide 123 act upon each other, a birefringence distribution generated in the light wavelength filter 121 is compensated, thereby making it possible to restrict an increase in a side lobe in a frequency characteristic.

In an acoustooptic filter like a light wavelength filter, an interval between light wavelengths that are multiplexed and the number of multiplexing operations vary depending upon optical communication systems. There is a strong demand for reducing costs of, in particular, an access-type optical communications system. Accordingly, in recent years, standards of, for example, CWDM (Coarse WDM) have been proposed. CWDM is for realizing a low-cost system by increasing the interval between wavelengths that are multiplexed. Therefore, in CWDM, there is a strong demand that the light wavelength filter have a flat characteristic over a broad band.

The light wavelength filters disclosed in the aforementioned "Low Drive-Power Integrated Acoustooptic Filter On X-cut Y-propagating $LiNbO_3$,"IEEEPHOTONICS TECHNOLOGY LETTERS, Vol. 3, No. 10, 1991, and the aforementioned "$LiNbO_3$ Tunable Wavelength Filter Using Acoustooptic Effect" (Year 200 Commemoration of Advanced Technology Symposium, "Piezoelectric Materials and Acoustic Wave Devices," February, 2000) both have narrow-band filter characteristics. Therefore, the light wavelength filters disclosed in the aforementioned "Low Drive-Power Integrated Acoustooptic Filter On X-cut Y-propagating $LiNbO_3$," IEEEPHOTONICS TECHNOLOGY LETTERS, Vol. 3, No. 10, 1991, and the aforementioned "$LiNbO_3$ Tunable Wavelength Filter Using Acoustooptic Effect" (Year 200 Commemoration of Advanced Technology Symposium, "Piezoelectric Materials and Acoustic Wave Devices," February, 2000) are not filters having flat wavelength transmission characteristics over a broad band, and as a result of which, they are not filters that are required in, for example, CWDM.

In the light wavelength filter disclosed in the aforementioned Japanese Unexamined Patent Application Publication No. 11-84331, a phase match condition in the mutual action area is made constant by compensating the birefringence distribution existing in the light wavelength filter as a result of changing the birefringence of the optical waveguide.

However, in order to achieve a broad-band wavelength transmission characteristic in this light wavelength filter, the mutual action area length must be short.

Figure 15:
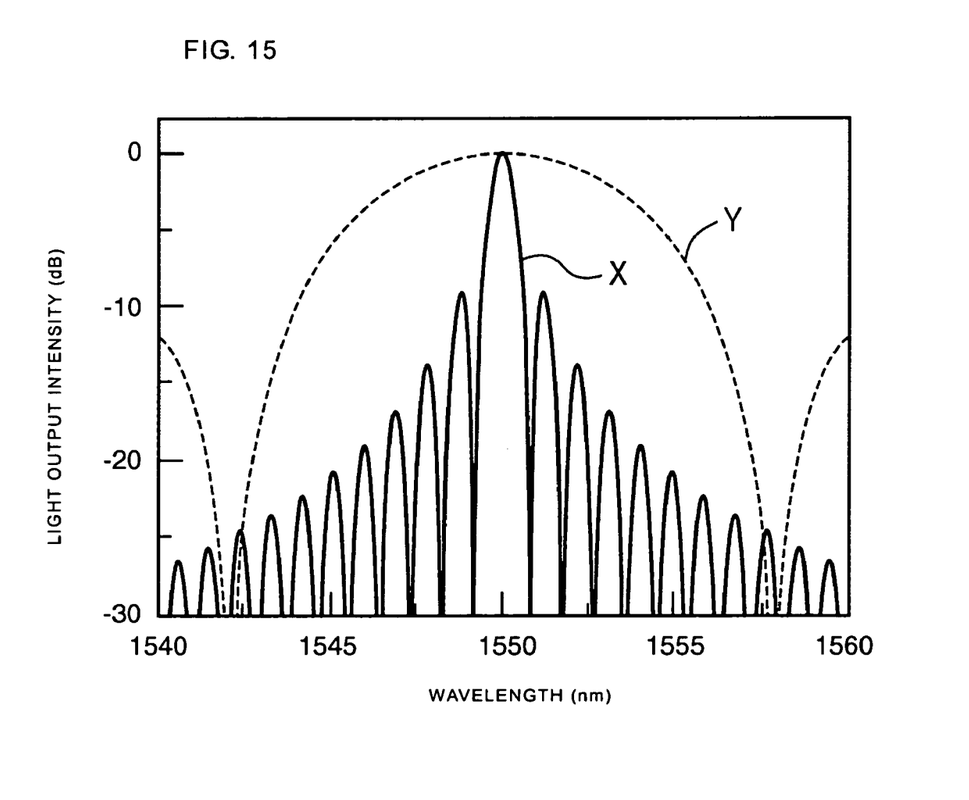
FIG. 15 is a graph illustrating a transmission characteristic in an acoustooptic filter.

More specifically, a wavelength transmission characteristic (indicated by a solid line X in FIG. 15) when a phase condition in the mutual action area is constant becomes a characteristic indicated by a broken line Y shown in FIG. 15 when the band of this filter is widened by a factor of 10.

Figure 16:
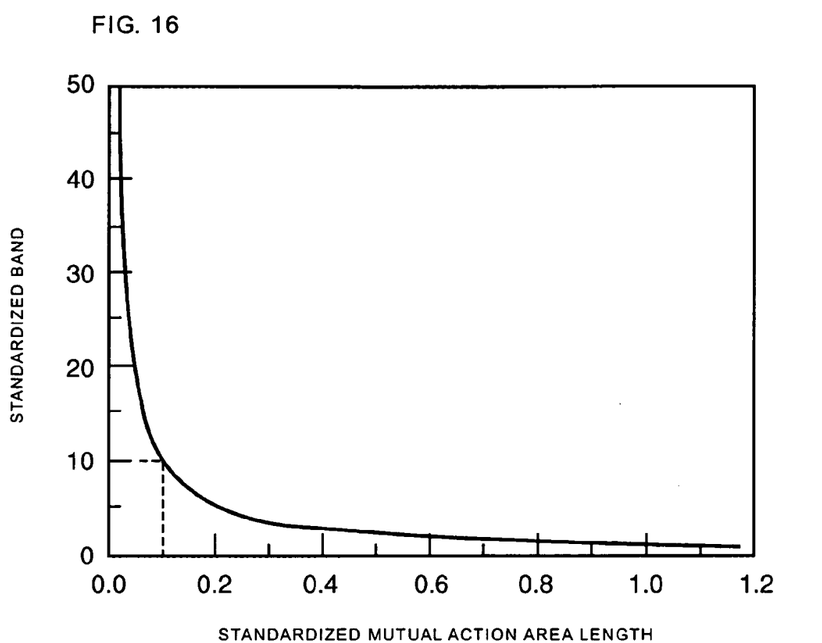
FIG. 16 is a graph showing the relationship between a standardized mutual action area length and a standardized band in the acoustooptic filter.
Figure 17:
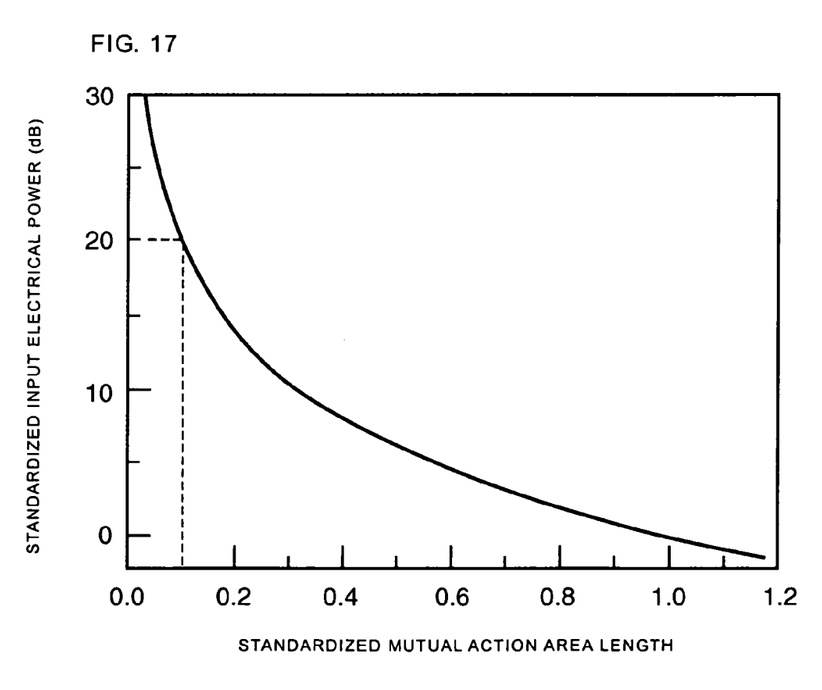
FIG. 17 is a graph showing the relationship between the standardized mutual action area length and an input electrical power in the acoustooptic filter.

FIGS. 16 and 17 show changes in the filter band with respect to the mutual action area length and changes in a required input electrical power with respect to the mutual action area length, respectively. Here, the mutual action area length, the input electrical power, and the transmission band are standardized as 1 when the characteristic shown by the solid line X in FIG. 15 is set. As is clear from FIGS. 16 and 17, when the band of the light wavelength filter is widened by a factor of 10, the mutual action area length is reduced to 1/10 of the length before widening the band, and the required input electrical power is increased by a factor of 100.

Therefore, the light wavelength filter of the related art disclosed in Japanese Unexamined Patent Application Publication No. 11-84331 cannot provide a flat wavelength transmission characteristic over a broad band and at low electrical power.

SUMMARY OF THE INVENTION

An object of the present invention is to provide an acoustooptic filter which can provide a flat wavelength transmission characteristic over a broad band and at low electrical power by overcoming the problems of the aforementioned related art.

The present invention provides an acoustooptic filter comprising an acoustooptic substrate having an optical waveguide disposed on a principal surface, an interdigital electrode disposed on the acoustooptic substrate and exciting a surface acoustic wave for converting a mode of light guided in the optical waveguide, with a surface wave waveguide for the surface wave excited by the interdigital electrode extending in substantially the same direction as the optical waveguide and the mode of the light guided to the optical waveguide being converted by the surface acoustic wave, and phase match condition changing means for changing a phase match condition at a mutual action area by 0.235% or more from a state in which phases are matched, the mutual action area being an area where the surface acoustic wave and the light guided to the optical waveguide act upon each other.

In a particular aspect of the acoustooptic filter according to the present invention, the phase match condition changing means is means for changing the phase speed of the surface acoustic wave at the mutual action area.

In another particular aspect of the acoustooptic filter according to the present invention, the phase match condition changing means is means for changing the phase speed of the surface acoustic wave at the surface wave waveguide.

In yet another particular aspect of the acoustooptic filter according to the present invention, the means for changing the phase speed of the surface acoustic wave at the surface wave waveguide is a thin-film ridge disposed at the surface wave waveguide.

In yet another particular aspect of the acoustooptic filter according to the present invention, the thickness of the thin-film ridge changes along the surface wave waveguide, so that the phase speed of the surface acoustic wave is changed at the surface wave waveguide.

In yet another particular aspect of the acoustooptic filter according to the present invention, the means for changing the phase speed of the surface wave at the surface wave waveguide has a structure in which the width of the surface wave waveguide changes in the direction of extension of the surface wave waveguide.

In yet another particular aspect of the acoustooptic filter according to the present invention, a pair of wall surfaces for reflecting the surface wave are disposed, one at each side of the surface wave waveguide, and the phase speed at the surface wave waveguide is changed by the pair of wall surfaces.

In yet another particular aspect of the acoustooptic filter according to the present invention, structures of wall members having the respective wall surfaces change along the surface wave waveguide, so that the phase speed of the surface acoustic wave is changed.

In yet another particular aspect of the acoustooptic filter according to the present invention, the distance between the pair of wall surfaces changes, so that the width of the surface wave waveguide changes.

In yet another particular aspect of the acoustooptic filter according to the present invention, the phase match condition changing means is a phase speed control film for changing the phase speed of the surface acoustic wave at the mutual action area.

In yet another particular aspect of the acoustooptic filter according to the present invention, the thickness of the phase speed control film is selected so that the phase match condition changes by 0.235% or more.

In yet another particular aspect of the acoustooptic filter according to the present invention, the phase match condition changing means is means for changing a propagation coefficient of the surface acoustic wave or an effective refractive index of the light at the mutual action area.

In yet another particular aspect of the acoustooptic filter according to the present invention, the means for changing a propagation coefficient of the surface acoustic wave or an effective refractive index of the light is means for setting a temperature distribution of the mutual action area.

In yet another particular aspect of the acoustooptic filter according to the present invention, the temperature distribution setting means is a heating element disposed on the acoustooptic substrate.

In yet another particular aspect of the acoustooptic filter according to the present invention, the heating element is a heater.

In yet another particular aspect of the acoustooptic filter according to the present invention, the interdigital electrode is the heating element.

In yet another particular aspect of the acoustooptic filter according to the present invention, the temperature distribution setting means is formed of a thin film disposed on the surface wave waveguide, and the thickness of the thin film partly differs so as to possess the temperature distribution.

In yet another particular aspect of the acoustooptic filter according to the present invention, the means for changing a propagation coefficient of the surface wave or an effective refractive index of the light at the mutual action area is disposed at the optical waveguide.

In yet another particular aspect of the acoustooptic filter according to the present invention, the means for changing a propagation coefficient or an effective refractive index of the light is the optical waveguide having a width which is set so as to change the phase match condition by 0.235% or more.

In yet another particular aspect of the acoustooptic filter according to the present invention, the means for changing a propagation coefficient or an effective refractive index of the light, which is disposed at the optical waveguide, is formed of metal diffused at the optical waveguide.

DETAILED DESCRIPTION OF THE INVENTION

The present invention will hereafter be described with reference to embodiments of the present invention shown in the drawings.

Figure 1A:
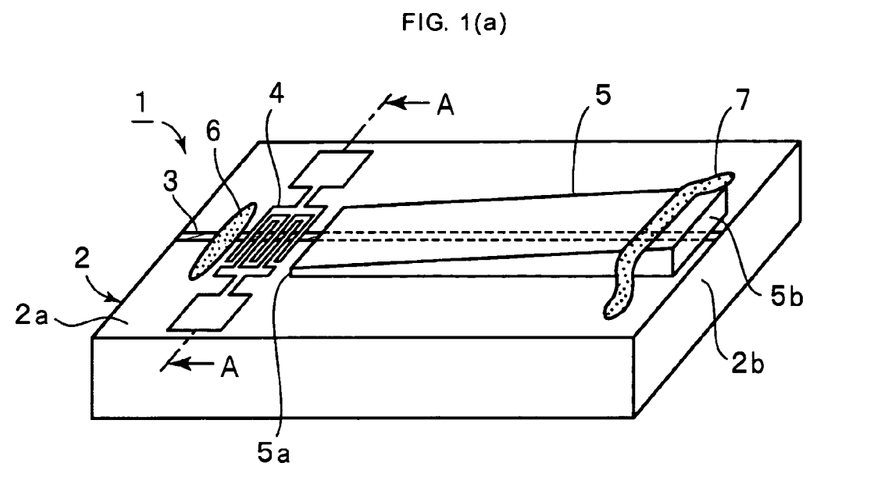
FIG. 1(a) is an external perspective view of an acoustooptic filter according a first embodiment of the present invention.
Figure 1B:
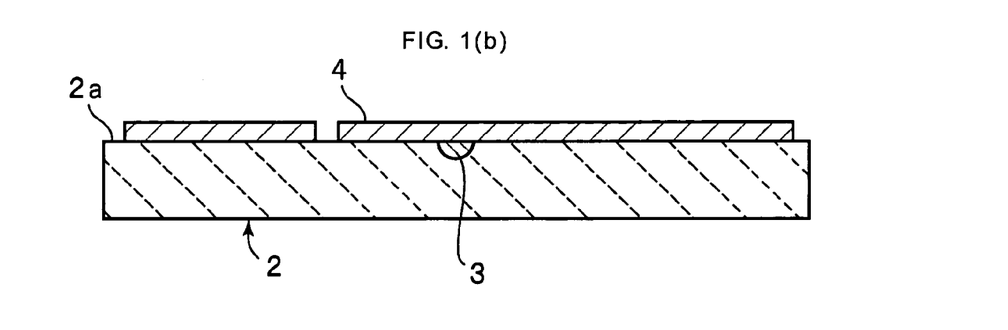
FIG. 1(b) is a sectional view taken along line A-A shown in FIG. 1(a).

FIG. 1(a) is a perspective view of an acoustooptic filter according a first embodiment of the present invention, and FIG. 1(b) is a schematic sectional view taken along line A-A shown in FIG. 1(a). An acoustooptic filter 1 has an X-cut Y-propagating LiNbO$_3$ piezoelectric substrate 2.

An optical waveguide 3 is centrally formed in a widthwise-direction on an upper surface 2a of the piezoelectric substrate 1 so as to extend longitudinally. The optical waveguide 3 is formed by thermally diffusing Ti. In the embodiment, the optical waveguide 3 is formed in an area having a width of 90 nm at the central portion of the upper surface 2a of the piezoelectric substrate 2 by thermally diffusing Ti for 8 hours at a temperature of 1040° C. The optical waveguide 3 is formed over the entire longitudinal-direction length of the upper surface 2a of the piezoelectric substrate 2. The length of the piezoelectric substrate 2 is 60 mm, and its width is 5 mm.

An interdigital electrode IDT 4 for exciting a surface acoustic wave is formed on the upper surface of the piezoelectric substrate 2. The IDT 4 is formed so that the wavelength is 20 µm, the electrode finger crossing width is 60 µm, and the center frequency is from 170 to 180 MHz.

A thin-film ridge 5 is formed in a mutual action area of the piezoelectric substrate 2. The mutual action area is an area where light guided to the optical waveguide 3 and a surface wave act upon each other. In the embodiment, this area extends from where the IDT 4 is disposed to an end face 2b of the piezoelectric substrate 2. The thin-film ridge 5 is formed by sputtering ZnO. The thin-film ridge 5 has a length of 30 mm and a width of 50 µm. As is clear from FIG. 1, the film thickness increases with increasing distance from an end 5a adjacent to the IDT 4. More specifically, the film thickness of the thin-film ridge 5 is 0.4 µm at the end 5a adjacent to the IDT 4 and is 1.0 µm at an opposite end 5b.

An absorbent 6 is disposed outwardly of the IDT 4. Another absorbent 7 is disposed at an outer end portion of the mutual action area. The absorbents 6 and 7 are formed of silicone rubber. Alternatively, the absorbents 6 and 7 may be formed of, for example, polyimide or epoxy.

A characteristic of the acoustooptic filter 1 according to the embodiment is that the film thickness of the thin-film ridge 5 changes from the end 5a to the end 5b, so that a mutual match condition in the mutual action area changes by approximately 1% from a state in which phases are matched. Therefore, a light transmission band is widened by a factor of approximately 30 without reducing the length of the mutual action area. This will be explained with reference to FIGS. 2 to 4.

The acoustooptic filter is a device which performs conversion between TE mode light and TM mode light. When the wavelength of light is λ, the propagation coefficients of the TE mode and the TM mode are βa and βb, the effective refractive indices are Na and Nb, and the phase speed of a surface acoustic wave is Λ, the phase match condition is represented by the following Formula (1):

$$|\beta_a - \beta_b| = \frac{2\pi}{\lambda}|N_a - N_b| = \frac{2\pi}{\Lambda} \quad (1)$$

Here, when the phase match condition is constant in the mutual action area, the width of the light transmission band is determined by the mutual action area length. Changing the phase match condition within the mutual action area length makes it possible to widen the light transmission band regardless of the mutual action area length. Therefore, it can be understood that the mutual action area can be long, and that the light transmission band can be wide at low electrical power.

Examples of means for changing such a phase match condition include means for changing the phase speed of a surface acoustic wave in the mutual action area and means for changing the propagation coefficient of the surface acoustic wave or the effective refractive index of light.

In the embodiment shown in FIG. 1, at the mutual action area, the phase speed of the surface acoustic wave is changed by the thin-film ridge 5, so that the phase match condition changes by approximately 1%.

Figure 2:
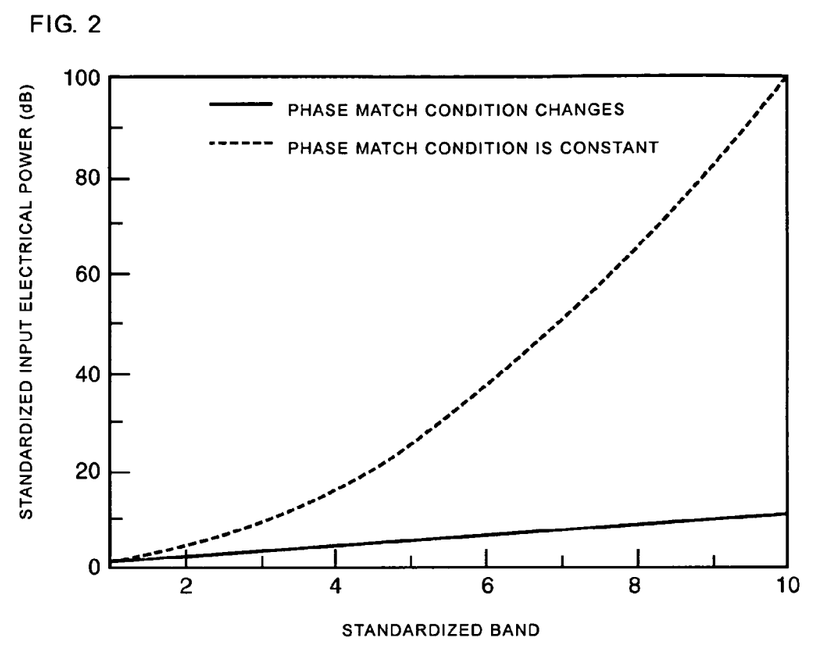
FIG. 2 is a graph showing the relationship between a standardized band and a standardized input electric power, with a solid line indicating a case in which a phase match condition changes and a broken line indicating a case in which the phase match condition is constant.

FIG. 2 is a graph showing the relationship between a standardized transmission band and a standardized input electric power. The broken line in FIG. 2 indicates a case in which the phase match condition is constant, while the solid line in FIG. 2 indicates a case in which the phase match condition changes. When the phase match condition is constant, the bandwidth changes on the basis of the mutual action area length.

More specifically, in order to increase the bandwidth by a factor of 10 when the phase match condition is constant, the mutual action area length must be reduced to ¹⁄₁₀ of the length before increasing the bandwidth. In this case, the input electrical power is increased by a factor of 100 as shown in FIG. 2. In contrast, in the case in which the phase match condition changes, when the bandwidth is increased by a factor of 10 and the mutual action area length remains unchanged, the input electrical power is increased by a factor of 10 (refer to FIG. 2).

In other words, when the phase match condition changes and the bandwidth is increased by a factor of 10, the required input electrical power is reduced to 1/10 of the required input electrical power of the case in which the phase match condition is constant. Even in the case in which the bandwidth is increased by a factor of 2, the required electrical power of the structure in which the phase match condition changes is half of that of the structure in which the phase match condition is constant.

Even if the bandwidth is increased as mentioned above, the larger the bandwidth, the larger the effect of reducing the input electrical power. In addition, increasing the mutual action area length can further reduce the input electrical power.

Figure 3:
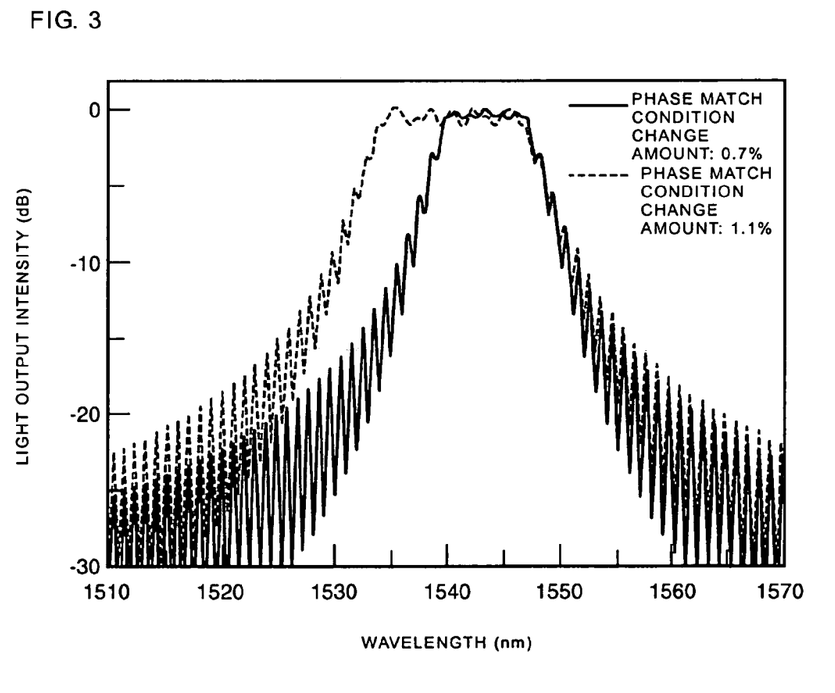
FIG. 3 is a graph showing characteristics of the acoustooptic filter when the phase match condition is changed by 0.7% and when the phase match condition is changed by 1.1%.

FIG. 3 is a graph showing characteristics of the acoustooptic filter according to the present invention when the phase match condition is changed by 0.7% and by 1.1% and the band is widened by a factor of 10 in comparison with the transmission band characteristics shown in FIG. 15. As shown in FIG. 3, changing the phase match condition by 0.7% can widen the band shown by the solid line in FIG. 15 by a factor of 10, and changing the phase match condition by 1.1% can widen the band by a factor of 35.

Figure 4A:
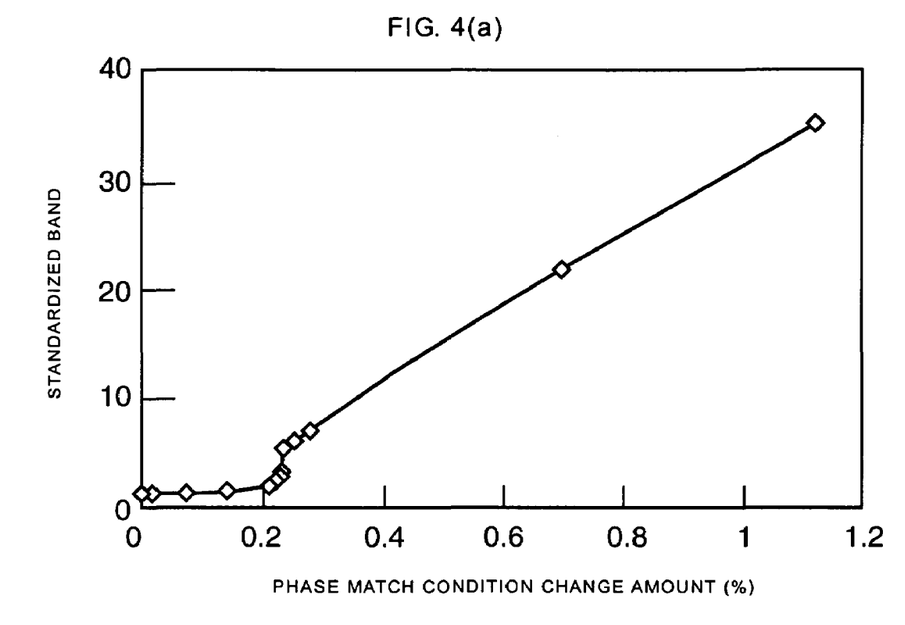
FIG. 4(a) is a graph showing the relationship between the standardized band and the amount of change in the phase match condition when the phase match condition is changed in the present invention.
Figure 4B:
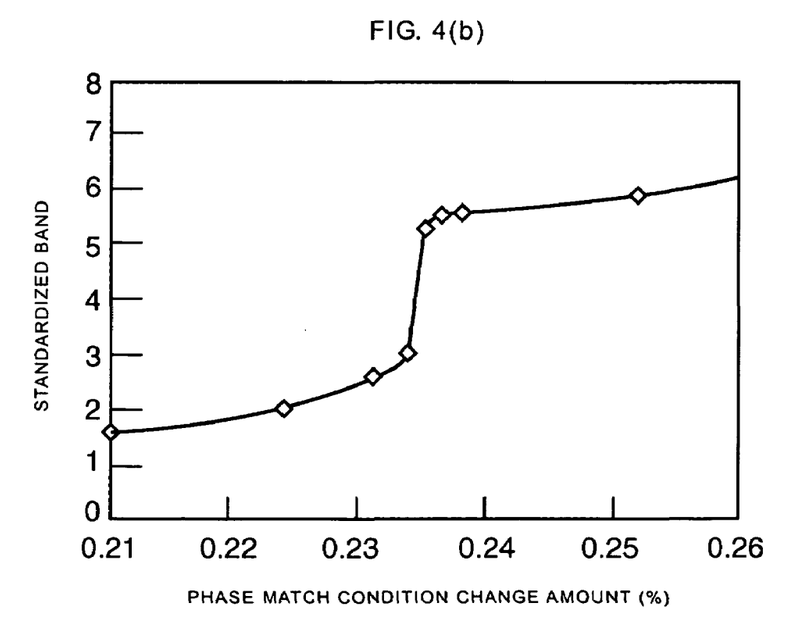
FIG. 4(b) is an enlarged view of the main portion of FIG. 4(a).

The change in the standardized band with respect to the amount of change in the phase match condition is shown in FIGS. 4(a) and 4(b). As is clear from FIG. 4(a) and FIG. 4(b), which is an enlarged view of FIG. 4(a), when the amount of change in the phase match condition becomes equal to or greater than 0.235%, the bandwidth can be effectively increased. Therefore, in the present invention, means for changing the phase match condition by 0.235% or more from a state in which phases are matched is provided, so that the acoustooptic filter has a broad-band optical wavelength characteristic.

In the acoustooptic filter 1 according to the embodiment shown in FIG. 1, as mentioned above, the thin-film ridge 5 is formed along the longitudinal direction of the mutual action area, and has a film thickness which changes from 0.4 to 1.0 µm, thereby changing the phase speed of the surface wave at the mutual action area by 1%. Therefore, the phase match condition changes by nearly 1%, so that a broad-band light transmission characteristic is achieved. In addition, it can be understood that, since it is not necessary to make the mutual action area short, a broad-band light transmission characteristic can be achieved at low electrical power.

Figure 5:
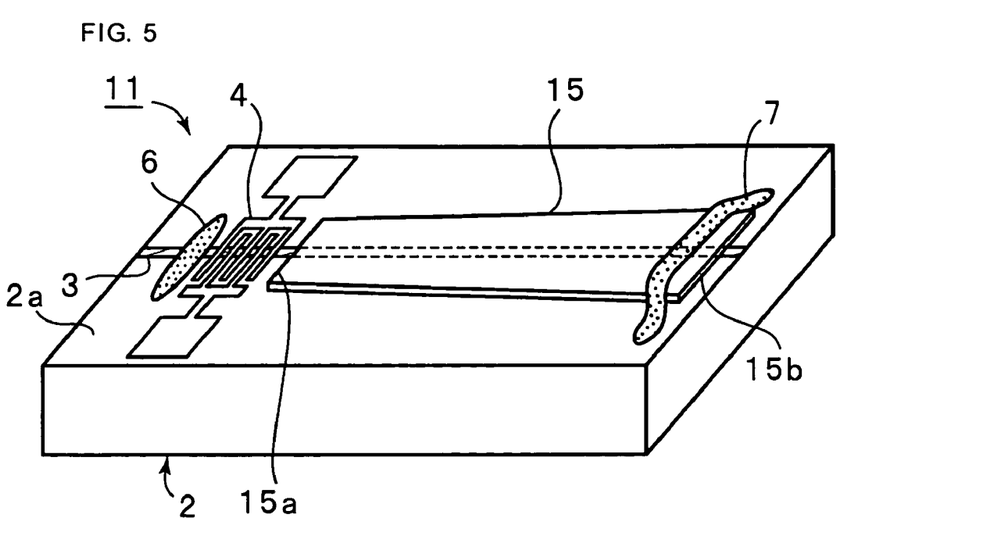
FIG. 5 is a perspective view of an acoustooptic filter of a modification of the first embodiment.

In the acoustooptic filter 1, the phase match condition is changed by increasing the thickness of the thin-film ridge 5 from the end 5a towards the end 5b. However, as shown in FIG. 5, the width of a thin-film ridge 15 may be increased from an end 15a towards an end 15b. In this modification shown in FIG. 5, the thin-film ridge 15 of an acoustooptic filter 11 has a length of 30 mm and a film thickness of 1.5 µm. The width at the end 15a is 20 µm, and the width at the end 15b is 40 µm. The other structural features of the acoustooptic filter 11 are the same as those of the acoustooptic filter 1.

Even in the acoustooptic filter 11, the width of the thin-film ridge 15 changes as mentioned above in a longitudinal direction of a mutual action area, so that the phase speed of a surface acoustic wave changes by nearly 1%. As a result, similarly to the acoustooptic filter 1 according to the first embodiment, a broad-band light transmission characteristic can be achieved at low electrical power.

The film thickness and the width of the thin-film ridge may both change along the longitudinal direction of the mutual action area by combining the first embodiment and the modification.

Figure 6:
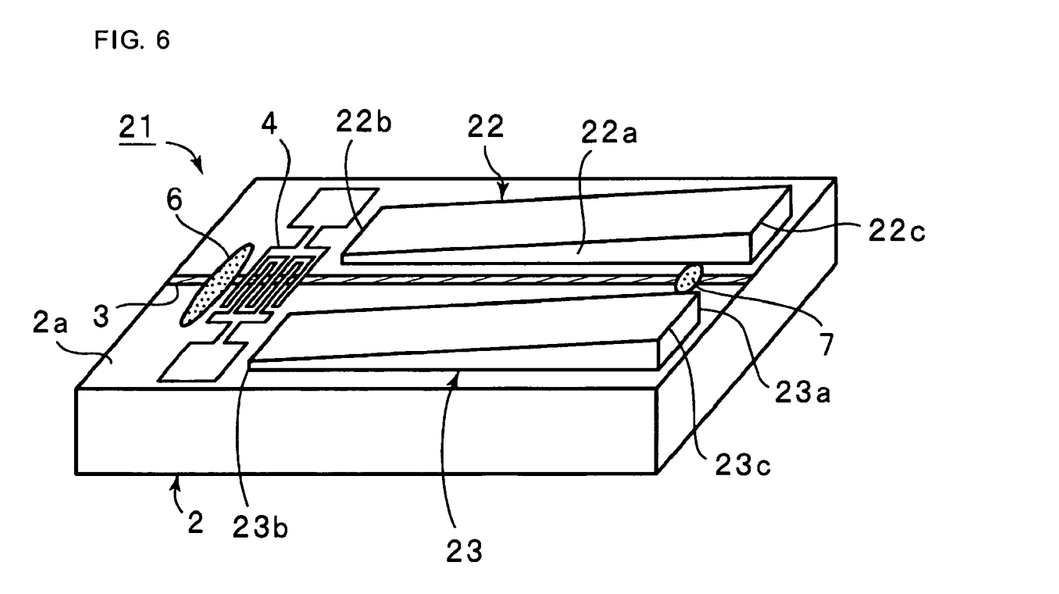
FIG. 6 is a perspective view of an acoustooptic filter according to a second embodiment.

FIG. 6 is a perspective view of an acoustooptic filter according to a second embodiment of the present invention. In an acoustooptic filter 21 according to the second embodiment, instead of the thin-film ridge 5 shown in FIG. 1, wall members 22 and 23 having respective wall surfaces 22a and 23a for reflecting a surface acoustic wave are disposed on a piezoelectric substrate 2. The other structural features of the acoustooptic filter 21 are the same as those of the acoustooptic filter 1.

The wall surface 22a of the wall member 22 and the wall surface 23a of the wall member 23 extend parallel with each other and in a longitudinal direction of a mutual action area. The wall members 22 and 23 are formed of a material transmitting sound at a higher speed than $LiNbO_3$ forming the piezoelectric substrate 2. In the embodiment, they are formed of AlN. Diffusing Ti in $LiNbO_3$ produces a similar effect.

The lengths of the wall surfaces 22a and 23a of the respective wall members 22 and 23 are 30 mm. The wall members 22 and 23 have film thicknesses that increase from respective ends 22b and 23b adjacent an IDT 4 towards respective opposite ends 22c and 23c. In other words, the heights of the wall surfaces 22a and 23a change so that they are 0.2 µm at the respective ends 22b and 23b and are 0.6 µm at the respective ends 22c and 23c.

In the acoustooptic filter 21 according to the second embodiment, the pair of wall surfaces 22a and 23a for reflecting a surface wave are provided, thereby forming a surface wave waveguide for a surface acoustic wave excited at the IDT 4. Since the lengths of the pair of wall surfaces 22a and 23a change in the longitudinal direction of the mutual action area, the phase speed of the surface wave changes at the surface wave waveguide. Therefore, the aforementioned phase match condition changes by approximately 1%.

Consequently, similarly to the acoustooptic filter 1 according to the first embodiment, since the phase match condition is changed by the wall members 22 and 23, it is possible to a achieve a broader light transmission band characteristic without reducing the mutual action area length.

Figure 7:
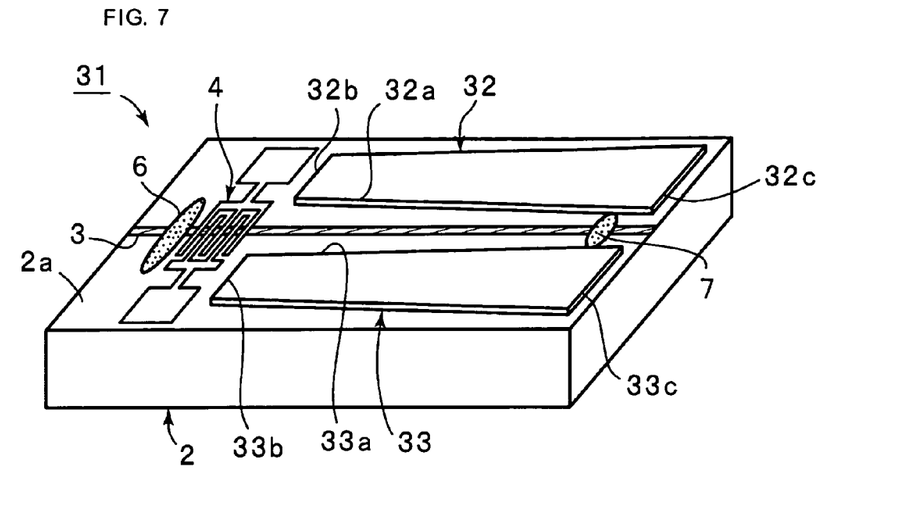
FIG. 7 is a perspective view of an acoustooptic filter of a modification of the second embodiment.

Although, in the second embodiment, the heights of the wall surfaces 22a and 23a change along the longitudinal direction of the mutual action area, the distance between wall surfaces 32a and 33a of respective wall members 32 and 33 may change in a longitudinal direction of a mutual action area as in an acoustooptic filter 31 in a modification shown in FIG. 7. In FIG. 7, the distance between the wall surface 32a and the wall surface 33a decreases from respective ends 32b and 33b adjacent to an IDT 4 towards respective opposite ends 32c and 33c. More specifically, the distance between the wall surfaces 32a and 33a is 480 µm at the ends 32b and 33b and is 120 µm at the ends 33c and 32c. Even in this case, as in the acoustooptic filter 21, the phase match condition changes by approximately 1%. Therefore, it is similarly possible to achieve a broad light transmission band characteristic at low electrical power.

The structure of the acoustooptic filter 21 according to the second embodiment and the structure of the acoustooptic filter 31 of the modification may be combined. More specifically, the heights of the pair of wall surfaces for propagating a surface wave at the surface acoustic wave waveguide and the distance between the pair of wall surfaces may both change in a longitudinal direction of the mutual action area.

Figure 8:
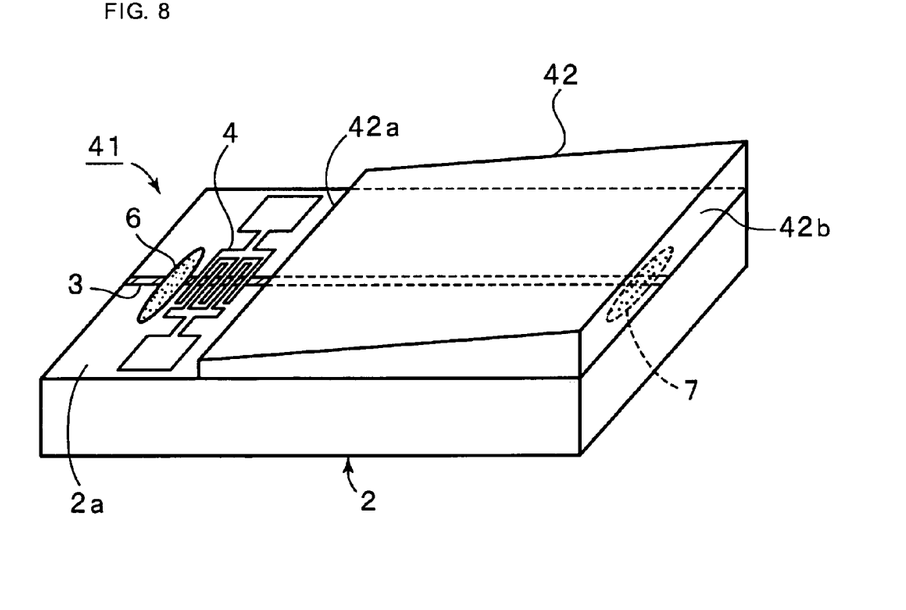
FIG. 8 is a perspective view of an acoustooptic filter according to a third embodiment.

FIG. 8 is a perspective view of an acoustooptic filter according to a third embodiment.

An acoustooptic filter 41 has the same structure as the acoustooptic filter 1 except that, instead of the thin-film ridge 5, a phase speed control film 42 is provided on a piezoelectric substrate 2. Here, the phase speed control film 42 is formed by sputtering ZnO, and has a length of 30 nm in a longitudinal direction of a mutual action area and has a width equal to the overall width of the piezoelectric substrate 2.

The phase speed control film 42 becomes thicker from an end 42a adjacent to an IDT 4 to an opposite end 42b. More specifically, the thickness at the end 42a is 0.4 µm, and the thickness at the end 42b is 1.0 µm.

In the acoustooptic filter 41, the phase speed control film 42 causes the phase speed of a surface acoustic wave to change as in the acoustooptic filter 1, so that the phase match condition changes by approximately 1%.

In the present invention, it is possible to change the aforementioned phase match condition by 0.235% or more from the state in which phases are matched by providing a temperature distribution to the mutual action area. In other words, means for providing a temperature distribution to the mutual action area may be used as the means for changing the phase match condition. A fourth embodiment based on such a principle will be described.

Figure 9:
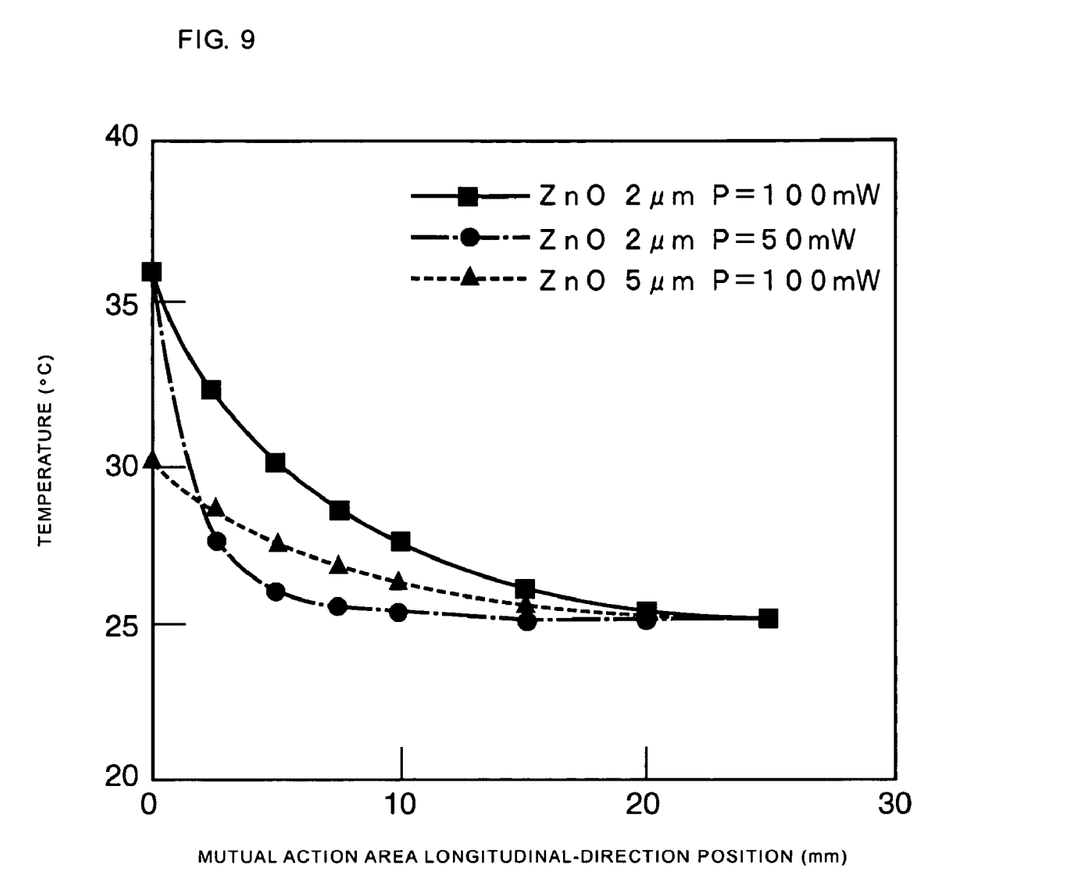
FIG. 9 is a graph illustrating states in which temperature gradients are set in a mutual action area in an acoustooptic filter according to a fourth embodiment.

As with the thin-film ridge 5 of the acoustooptic filter 1 shown in FIG. 1, a ZnO film is formed on a piezoelectric substrate 2 by sputtering ZnO. In this case, as with the thin-film ridge 5 shown in FIG. 1, the thickness of the ZnO changes in a longitudinal direction of a mutual action area. Changing an input electrical power applied to an IDT 4 makes it possible to set a temperature gradient in the longitudinal direction of the mutual action area. FIG. 9 is a graph showing temperature distributions of the mutual action area when the thickness of the ZnO film is constant at 2 µm and the input electrical power is 50 mW, when the thickness of the ZnO film is constant at 2 µm and the input electrical power is 100 mW, and when the thickness of the ZnO film is constant at 5 µm and the input electrical power is 100 mW, respectively.

As is clear from FIG. 9, it can be understood that a temperature gradient is set over the longitudinal direction of the mutual action area by selecting the thickness of the ZnO film and the input electrical power. By setting such a temperature gradient, the propagation coefficient of a surface acoustic wave or the effective refractive index of light are changed in the longitudinal direction of the mutual action area, so that the phase match condition is changed.

Therefore, the temperature gradient is set so that the phase match condition changes by 0.235% or more from the state in which phases are matched. Therefore, it can be understood that, like the acoustooptic filter 1 according to the first embodiment, the acoustooptic filter according to the fourth embodiment provides a broad light transmission characteristic without reducing the length of the mutual action area.

Although, in the embodiment, the ZnO film is provided, it does not need to be provided, in which case only a heating element of the IDT 4 may be changed by controlling the input electrical power. Alternatively, a temperature gradient may be set by changing the thickness of the ZnO film in the longitudinal direction of the mutual action area like the thin-film ridge 5.

Figure 10:
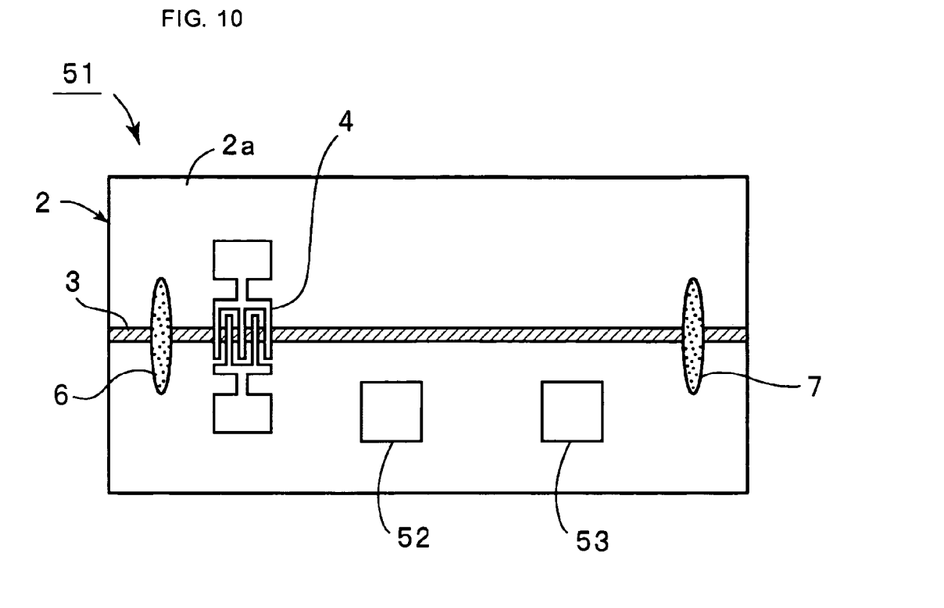
FIG. 10 is a perspective view of an acoustooptic filter according to a fifth embodiment.

As in an acoustooptic filter 51 of a modification shown in FIG. 10, heaters 52 and 53 may be disposed on an upper surface 2a of a piezoelectric substrate 2. By disposing the heaters 52 and 53 near a mutual action area, it is possible to set a temperature gradient in a longitudinal direction of the mutual action area.

Figure 11:
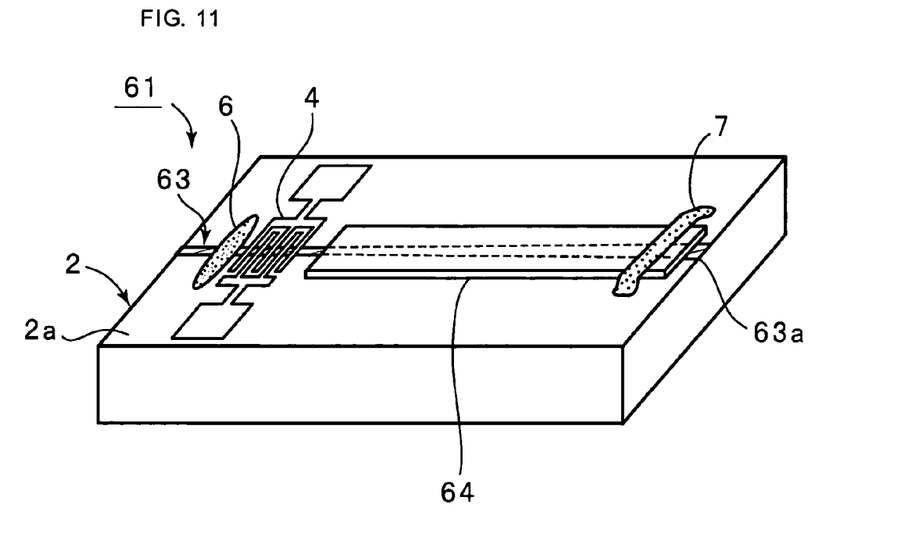
FIG. 11 is a perspective view of an acoustooptic filter according to a sixth embodiment.

FIG. 11 is a perspective view of an acoustooptic filter according to a fifth embodiment of the present invention. In an acoustooptic filter 61, an optical waveguide 63 is provided in an upper surface 2a of a piezoelectric substrate 2. Here, the width of the optical waveguide 63 changes in a longitudinal direction of a mutual action area. More specifically, the optical waveguide 63, which is formed by thermally diffusing Ti, has a width of 6 µm at a side where an IDT 4 is disposed and a width of 8 µm at an outer end of the mutual action area, that is, at an end 63a of the optical waveguide 63.

In the acoustooptic filter 61, although a ZnO film 64 is provided at the mutual action area to change the phase speed of a surface wave, the ZnO film 64 does not necessarily have to be provided.

In the acoustooptic filter 61, the width of the optical waveguide 63 changes as mentioned above in the longitudinal direction of the mutual action area, so that the phase match condition changes from the state in which phases are matched. Therefore, by changing the width of the optical waveguide 63 so that the phase match condition changes by 0.235% or more from the state in which the phases are matched, the acoustooptic filter 61 can provide a broad light transmission characteristic without reducing the length of the mutual action area like the acoustooptic filter 1 according to the first embodiment.

Although, in the acoustooptic filter 61, the width of the optical waveguide 63 changes in the longitudinal direction of the mutual action area, the depth of the optical waveguide 63 may change. In other words, it is possible to change the phase match condition by changing the width of a Ti diffusion area in the longitudinal direction of the mutual action area when diffusing Ti with respect to the upper surface 2a of the piezoelectric substrate 2. For example, when the depth of the area in which Ti is diffused, that is, the thickness of the optical waveguide 63 changes in the range of from 80 to 100 nm, it is possible to, as with the acoustooptic filter 61, change the phase match condition by 0.235% or more.

The acoustooptic substrate used in the present invention may be a cut angle $LiNbO_3$ substrate or other types of piezoelectric substrates instead of an X-cut Y-propagating $LiNbO_3$ substrate.

As described above, the acoustooptic filter according to the present invention comprises phase match condition changing means for changing a phase match condition at the mutual action area by 0.235% or more from the state in which phases are matched, the mutual action area being an area where light guided to the optical waveguide and a surface acoustic wave act upon each other. Therefore, it is possible to provide a broad light transmission characteristic without reducing the length of the mutual action area. Consequently, it is possible to provide a broad transmission characteristic at low electrical power.

When the phase match condition changing means is means for changing the phase speed of the surface acoustic wave at the mutual action area, a structure for changing the phase speed of the surface acoustic wave only needs to be provided at the mutual action area to make it possible to provide a broad-band light transmission characteristic in accordance with the present invention.

For example, when the means for changing the phase speed of a surface acoustic wave or a thin-film ridge is provided at the surface wave waveguide, it is possible to easily change the phase speed of the surface wave. In addition, by changing the thickness of the thin-film ridge along the surface wave waveguide, it is possible to easily change the phase speed of the surface acoustic wave at the surface wave waveguide.

Alternatively, it is possible to easily change the phase speed of the surface wave by changing the width itself of the surface wave waveguide in the direction of extension of the surface wave waveguide.

Further, it is possible to change the phase speed at the surface wave waveguide by making use of a pair of wall surfaces for reflecting the surface wave, the pair of wall surfaces being disposed, one at each side of the surface wave waveguide. For example, the structures of the wall members having the respective wall surfaces may change along the surface wave waveguide. Alternatively, it is possible to change the width of the surface wave waveguide by changing the distance between the pair of wall surfaces.

In the present invention, the phase match condition changing means may be a phase speed control film for changing the phase speed of the surface acoustic wave at the mutual action area. In this case, the thickness of the phase speed control film is set so that the phase match condition changes by 0.235% or more.

In the present invention, the phase match condition changing means may be means for changing the propagation coefficient or an effective refractive index of light at the mutual action area. An example of such means is temperature distribution setting means for setting a temperature gradient at the mutual action area. Therefore, for example, a heating element or a heater may be provided on the acoustooptic substrate, or an interdigital electrode may be used as a heating element by controlling the input electrical power of the interdigital electrode itself. The temperature distribution setting means may be formed by using a thin film that is provided on the surface wave waveguide, in which case the thickness of the thin film may partly differ so as to possess the temperature distribution. This makes it possible to easily set the temperature distribution at the mutual action area, so that it is possible to achieve a broad light transmission characteristic at low electrical power by changing the phase match condition in accordance with the present invention.

In the present invention, the means for changing the propagation coefficient of the surface wave or the effective refractive index of light at the mutual action area may be provided by the optical waveguide itself. For example, the width of the optical waveguide may change in the longitudinal direction of the mutual action area so that the phase match condition changes by 0.235% or more, or the depth of the metal diffusion area in which metal is diffused for forming the optical waveguide, that is, the depth of the optical waveguide may change in the longitudinal direction of the mutual action area, so that the phase match condition changing means is formed. Therefore, it is possible to easily provide an acoustooptic filter having a broad light transmission characteristic at low electrical power by only controlling the method of diffusing the metal.

The invention claimed is:

1. An acoustooptic filter comprising:
   an acoustooptic substrate;
   an optical waveguide disposed along a surface of the acoustooptic substrate;
   an interdigital electrode disposed on the acoustooptic substrate, the interdigital electrode exciting a surface acoustic wave; and
   a surface wave waveguide for the surface wave excited by the interdigital electrode extending in substantially a same direction as the optical waveguide and coupled to the surface acoustic wave excited by the interdigital electrode such that the mode of the light guided to the optical waveguide is converted by the surface acoustic wave,
   the surface wave waveguide including a phase match condition changer that changes a phase match condition of the surface acoustic wave and the light guided to the optical waveguide at a mutual action area by about 0.235% or more from a state in which phases are matched, the mutual action area being an area where the surface acoustic wave and the light guided to the optical waveguide act upon each other.

2. The acoustooptic filter according to claim 1, wherein the phase match condition changer changes the phase speed of the surface acoustic wave at the mutual action area.

3. The acoustooptic filter according to claim 2, wherein the phase match condition changer changes the phase speed of the surface acoustic wave at the surface wave waveguide.

4. The acoustooptic filter according to claim 3, wherein the phase match condition changer is a thin-film ridge disposed at the surface wave waveguide.

5. The acoustooptic filter according to claim 4, wherein a thickness of the thin-film ridge changes along a length of the surface wave waveguide.

6. The acoustooptic filter according to claim 3, wherein the phase match condition changer has a structure in which the width of the surface wave waveguide changes in the direction of extension of the surface wave waveguide.

7. The acoustooptic filter according to claim 3, wherein the phase match condition changer comprises a pair of wall surfaces for reflecting the surface wave disposed on opposite sides of the surface wave waveguide.

8. The acoustooptic filter according to claim 7, wherein a thickness of the pair of wall surfaces change along a length of the surface wave waveguide.

9. The acoustooptic filter according to claim 7, wherein a distance between the pair of wall surfaces changes.

10. The acoustooptic filter according to claim 2, wherein the phase match condition changer is a phase speed control film.

11. The acoustooptic filter according to claim 10, wherein the phase speed control film has a changing thickness.

12. The acoustooptic filter according to claim 1, wherein the phase match condition changer changes one of a propagation coefficient of the surface acoustic wave and an effective refractive index of the light at the mutual action area.

13. The acoustooptic filter according to claim 12, wherein the phase match condition changer sets a temperature distribution of the mutual action area.

14. The acoustooptic filter according to claim 13, wherein the phase match condition changer is a heating element disposed on the acoustooptic substrate.

15. The acoustooptic filter according to claim 14, wherein the heating element is a heater.

16. The acoustooptic filter according to claim 14, wherein the interdigital electrode is the heating element.

17. The acoustooptic filter according to claim 13, wherein the phase match condition changer is formed of a thin film disposed on the surface wave waveguide, and the thickness of the thin film partly differs so as to create the temperature distribution.

18. The acoustooptic filter according to claim 12, wherein the phase match condition changer is disposed at the optical waveguide.

19. The acoustooptic filter according to claim 18, wherein the phase match condition changer is the optical waveguide, the optical waveguide having a width sufficient to change the phase match condition.

20. The acoustooptic filter according to claim 18, wherein the phase match condition changer is formed of a metal diffused at the optical waveguide.

* * * * *